P. R. MOSES.
ATTACHMENT FOR RADIATOR VALVES.
APPLICATION FILED MAR. 31, 1908.

919,372.

Patented Apr. 27, 1909.

WITNESSES:
Ethel D. Elwell
Arthur Watson

INVENTOR
Percival Robert Moses
BY
Clarence E. Catchron
ATTORNEY

THE NORRIS PETERS CO., WASHINGTON, D. C.

UNITED STATES PATENT OFFICE.

PERCIVAL ROBERT MOSES, OF NEW YORK, N. Y.

ATTACHMENT FOR RADIATOR-VALVES.

No. 919,372.  Specification of Letters Patent.  Patented April 27, 1909.

Application filed March 31, 1908. Serial No. 424,413.

*To all whom it may concern:*

Be it known that I, PERCIVAL ROBERT MOSES, a citizen of the United States, and residing in New York city, in the county and State of New York, have invented an Improvement in Attachments for Radiator-Valves, of which the following is a specification.

This attachment is designed to avoid the difficulty and discomfort occasioned in turning on and off the ordinary valve in general use on radiators. It is simple in its construction and can be attached to any standard radiator valve, whether globe or gate valve. This is an important feature for the attachment can be made without disturbing the piping or removing the old valve body.

For greater clearness, reference is made to the accompanying drawings in which the same letters stand for similar parts of the device.

Figure 3:
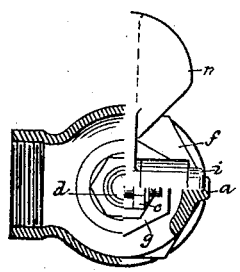
Figure 4:
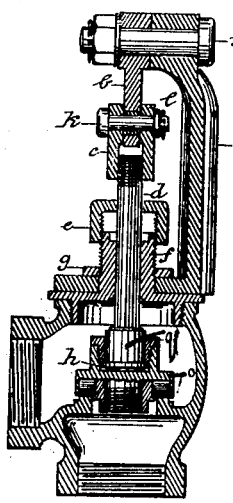
Figure 1:
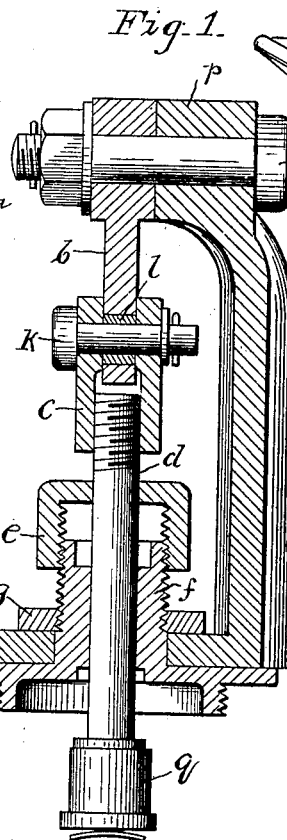
Figure 2:
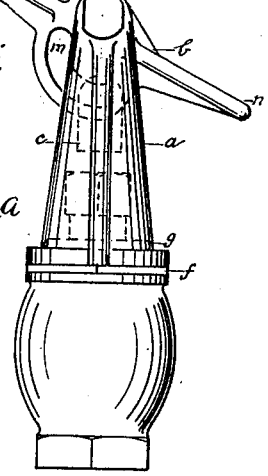

Figure 1 shows a vertical cross section of my valve attachment, ready for screwing into a standard valve. Fig. 2 is a side elevation. Fig. 3 shows a plan and half horizontal section and Fig. 4 a vertical cross section. Figs. 2, 3 and 4 show the application of the attachment to an angle valve.

$f$ is the valve bonnet or cap with screw thread for screwing into the valve body and for receiving the packing nut $g$; $d$ is the valve stem with screw thread at the upper end which screws into the yoke $c$; the valve stem $d$ has a head $q$ formed at the lower end to receive the valve head $o$; $k$ is a bolt, passing through the cam slot $m$ in the sector $b$; $l$ is a roller surrounding the bolt $k$ at the point where it passes through the sector $b$; $i$ is a bolt passing through the bearing $p$, being the upper end of the support $a$. The sector $b$ has arms $n$ and $n$ to allow operation by pressing the foot against either arm, or in any manner desired. It will be seen, that though the nut $g$ holds the support $a$ firmly against the valve bonnet, it allows the support to be set at any desired horizontal angle.

$h$ is a spring washer used to hold the valve head against the seat in the body of the valve when the stem contracts by cooling.

The operation of this valve is as follows: In the position shown on the elevation, Fig. 2, the valve is closed. If then, the foot is pressed on the upper end of the pedal, depressing that end, of the pedal, the cam slot passes the bolt, and, as the distance from the point of support to the cam groove decreases, the bolt and valve stem and valve are forced to rise. To close the valve the opposite action takes place.

It should be noted that the support of the cam is made separate from the cover of the valve for two reasons. In the first place it is easier to make and makes it easier to replace the other parts of the valve; and chiefly it is important because it allows the pedals to be set at any horizontal angle in relation to the entering pipe. That is to say, the attachment can be put on at right angles to the line entering the radiator, or in line with the radiator or at any other angle with the radiator. It should be noted also that the cam slot is so shaped that the upward pressure of the valve head and valve stem is resisted vertically, hence there is no possibility of the valve opening by itself.

What I claim as my invention is:

The combination with a valve comprising a valve casing having a seat therein, a valve stem carrying a head at its lower end adapted to be pressed against the valve seat, said casing being provided with a bonnet surrounding the valve stem, of a bracket formed of an arm, and a base plate extending at right angles to the arm, said base plate being provided with a central perforation through which the valve bonnet is adapted to extend and whereby the bracket may be secured to the bonnet by the packing gland, of a sector provided with an eccentric slot and pivoted to the upper end of said bracket, a sleeve secured to the upper end of the valve stem and carrying a pin engaging said eccentric slot, and foot pedals extending from opposite sides of the sector whereby the same may be operated.

PERCIVAL ROBERT MOSES.

Witnesses:
VIVIAN GREEN,
JULIUS MANGER.